(12) United States Patent
Klein et al.

(10) Patent No.: US 8,058,905 B1
(45) Date of Patent: Nov. 15, 2011

(54) CLOCK DISTRIBUTION TO FACILITATE GATED CLOCKS

(75) Inventors: Matthew H. Klein, Redwood City, CA (US); Richard W. Swanson, San Jose, CA (US); Trevor J. Bauer, Boulder, CO (US); Steven P. Young, Boulder, CO (US); Andy DeBaets, Cupertino, CA (US)

(73) Assignee: Xilinx, Inc., San Jose, CA (US)

( * ) Notice: Subject to any disclaimer, the term of this patent is extended or adjusted under 35 U.S.C. 154(b) by 40 days.

(21) Appl. No.: 12/363,722

(22) Filed: Jan. 31, 2009

(51) Int. Cl.
H03K 19/00 (2006.01)
H03K 3/356 (2006.01)

(52) U.S. Cl. .......................................... 326/93; 327/208

(58) Field of Classification Search .............. 326/37–41, 326/47, 83, 86, 87, 93, 95; 327/198, 208–212, 327/214, 215, 224, 225; 716/8
See application file for complete search history.

(56) References Cited

U.S. PATENT DOCUMENTS

| | | | |
|---|---|---|---|
| 5,315,181 A | 5/1994 | Schowe | |
| 5,452,239 A | 9/1995 | Dai et al. | |
| 5,914,616 A | 6/1999 | Young et al. | |
| 5,980,092 A | 11/1999 | Merryman et al. | |
| 6,204,695 B1 | 3/2001 | Alfke et al. | |
| 6,272,667 B1 | 8/2001 | Minami et al. | |
| 6,288,568 B1 | 9/2001 | Bauer et al. | |
| 6,313,683 B1 | 11/2001 | Block et al. | |
| 6,456,115 B2 | 9/2002 | Li et al. | |
| 6,668,363 B2 | 12/2003 | Minami et al. | |
| 6,782,486 B1 | 8/2004 | Miranda et al. | |
| 7,126,406 B2 * | 10/2006 | Vadi et al. | 327/293 |
| 7,129,765 B2 * | 10/2006 | Vadi et al. | 327/293 |
| 7,372,299 B2 * | 5/2008 | Vadi et al. | 326/41 |
| 7,414,430 B2 * | 8/2008 | Vadi et al. | 326/41 |
| 7,518,401 B2 * | 4/2009 | Vadi et al. | 326/41 |
| 2001/0029599 A1 | 10/2001 | Minami et al. | |
| 2005/0242866 A1 * | 11/2005 | Vadi et al. | 327/291 |
| 2008/0059923 A1 | 3/2008 | Sasaki et al. | |
| 2009/0055781 A1 | 2/2009 | Araya | |
| 2009/0217068 A1 | 8/2009 | Fernsler, Jr. et al. | |

FOREIGN PATENT DOCUMENTS

WO WO 02/14993 A2 2/2002

OTHER PUBLICATIONS

U.S. Appl. No. 12/363,721, filed Jan. 31, 2009, Matthew H. Klein et al., Xilinx, Inc. 2100 Logic Drive, San Jose, CA 95124.

(Continued)

Primary Examiner — Shawki S Ismail
Assistant Examiner — Dylan White
(74) Attorney, Agent, or Firm — Steven H. Slater; Kevin T. Cuenot (57) ABSTRACT

Circuits and methods for facilitating distribution of gated clocks in a programmable integrated circuit such as a field programmable gate array (FPGA) are described. Dynamic power savings are achieved in a FPGA by providing gated clock driver circuitry at various places in a hierarchical clock distribution network. The gated clock circuitry provides a clock signal gated by an enable signal to clocked elements. Configurable logic blocks (CLBs) comprising the clocked elements and programmable interconnect tiles are disposed in the gate array. Clock signals are distributed to the CLBs via a clock distribution network. Clock enable signals are provided corresponding to some of the clock signals. Clock buffers or drivers are provided within the clock distribution network that drive gated clock signals to CLBs. By disabling certain clocked elements using one or more embodiments of the invention when portions of the FPGA are inactive, dynamic power consumption is reduced.

16 Claims, 11 Drawing Sheets

OTHER PUBLICATIONS

Xilinx, UG070, Virtex-4 FPGA Users Guide, Jun. 17, 2008, available from Xilinx, Inc., 2100 Logic Drive, San Jose, California 95124, or at the web url www.xilinx.com/support/documentation/user_guides/ug070.pdf.

Xilinx ISE 8 Software Manuals and Help—PDF Collection, Dec. 12, 2005, 16 pages, available at the internet url http://www.xilinx.com/itp/xilinx8/books/manuals.pdf.

Wang et al., "Clock Power Reduction for Virtex-5 FPGAs", FPGA2009, Feb. 22-24, 2009, 10 pages.

* cited by examiner

CLOCK DISTRIBUTION TO FACILITATE GATED CLOCKS

RELATED APPLICATIONS

This application relates to U.S. application Ser. No. 12/363,721, filed Jan. 31, 2009, entitled "System and Methods for Reducing Clock Power in Integrated Circuits", which application is hereby incorporated herein by reference in its entirety.

FIELD OF THE INVENTION

One or more embodiments of the present invention relate, in general, to programmable integrated circuits such as programmable logic devices (PLDs) including field programmable gate array (FPGA) circuits and complex PLD (CPLD) circuits. More particularly, one or more embodiments of the invention are applicable to a system and method for facilitating gated clocks in programmable integrated circuits such as FPGA circuits.

BACKGROUND

In designing and fabricating programmable integrated circuits, PLD integrated circuits including, for example, CPLD or FPGA devices, are frequently used. A circuit designer typically approaches the design of a device using FPGA or CPLD technology by accessing a library of known functions, which are selected as circuit elements, and which are then coupled together using design tools to form useful circuitry. The output of the design process is typically a netlist of wired connections, or other connectivity information, coupling instances of the selected circuit elements. Circuit elements in such libraries include relatively low level devices such as input and output buffers, clock buffers, NAND and NOR gates. Circuit elements may further include higher level devices such as registers, flip-flops, register files, memory arrays, and even processors or CPUs, and specialized functions such as digital signal processors (DSPs) may be provided as library elements.

By selecting the necessary circuit elements and coupling them together, a circuit designer can quickly create a new functional integrated circuit. Because CPLD/FPGA technology allows automated tools to program a pre-existing completed packaged integrated circuit device, the integrated circuit can quickly be completed as a physical device and tested. In contrast, the manufacture of custom, semi-custom or application specific integrated circuits (ASICs) requires that the circuit designer complete the design and then wait for silicon devices to be manufactured, packaged, tested and delivered as integrated circuits before the physical devices are available. Thus, PLD technology allows fast design, verification and production of integrated circuits. Further, certain FPGA devices are programmed using non-volatile memory devices or even one time programmable elements to contain the programming, e.g. the interconnect selections and the circuit functional selections. Since in some cases these devices can be reprogrammed, changes to the design or modifications to fix errors in the design may be made quickly and without the need for waiting for additional silicon manufacture to occur.

Like many integrated circuits, present FPGA and CPLD designs use more power than is desirable. Power consumed may be described as static and dynamic power. Dynamic power is consumed during circuit operations when one or more elements of the circuit are changing state. One approach to saving dynamic power in current PLD integrated circuits, such as FPGAs or CPLDs, which are typically CMOS logic devices, is to provide clock enables to the clocked elements including registers or flip-flops. When the clock to a clocked element is disabled by an enable signal, the register or flip-flop transistors coupled to the clock line will not change state, thus saving dynamic power. When a particular circuit element that is clocked is not in use, the circuit can selectively disable the clock to that portion, and thereby save power that would otherwise be consumed with each clock transition.

However, the use of many of these clock enable lines in a PLD design places a high demand on the routing area resources of the device. The clock enable line is an additional signal, in addition to the clock signal, that is now routed to many clocked elements on the programmed integrated circuit. In some prior art FPGAs, the clock enable lines are even routed to some circuits where they are never used. The clock enable lines therefore take up valuable routing circuit area, limiting the availability of routing area for other purposes.

In the prior art, clock gating circuits are known for providing a clock signal that is gated by an enable signal. Because a change in the enable signal could appear in the gated clock signal as a partial or "runt" output clock signal if a simple logic gate were used, clock gating circuits are designed to prevent erroneous outputs on the gated clock signal.

Figure 1:
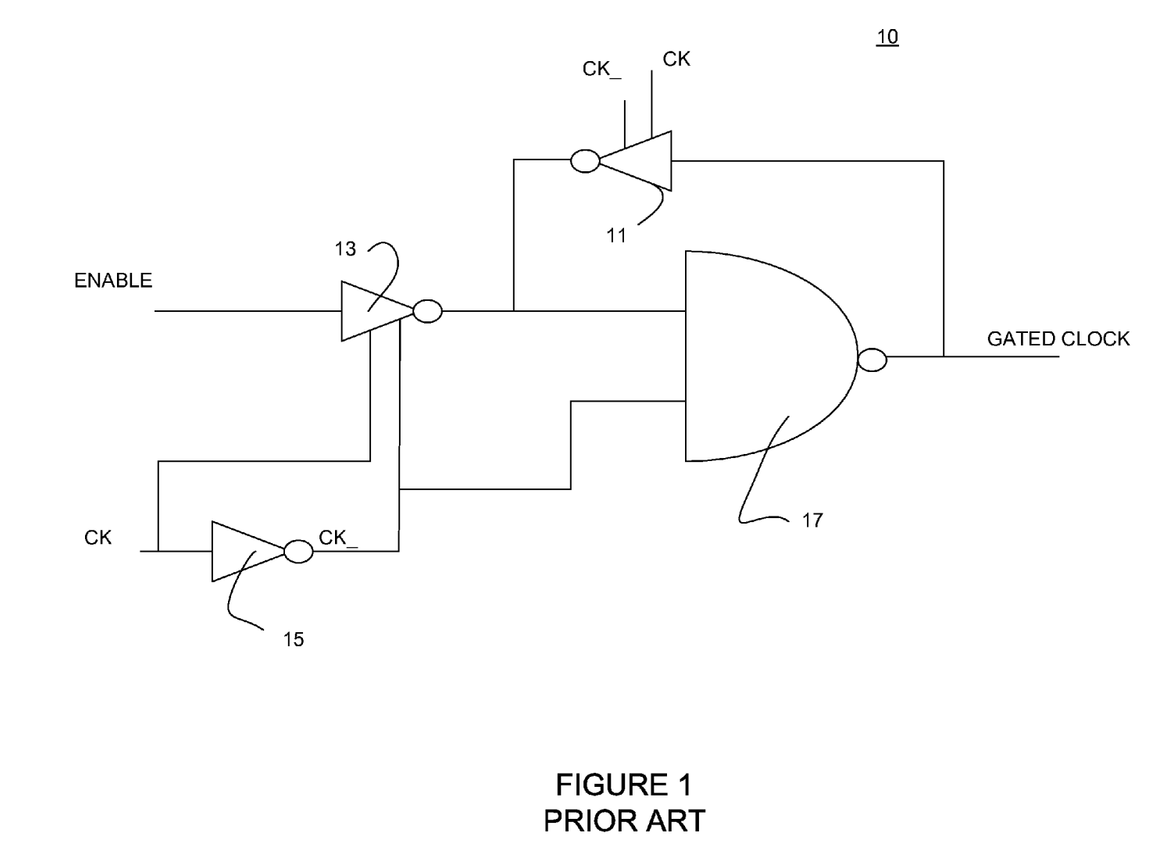
FIG. 1 depicts a schematic of a prior art circuit for providing a gated clock signal.

FIG. 1 depicts, for example, a first clock gating circuit of the prior art described in U.S. Pat. No. 6,456,115, which is hereby incorporated herein by reference. The patent provides several similar embodiments for providing a gated clock signal without requiring a flip flop or latch to do so. In FIG. 1, circuit 10 includes elements 11 and 13 which receive both the clock and inverted clock signals CK and CK_, and pass the output of the element to the next element only when the clock CK falls. The ENABLE signal and the clock signal CK_ are then combined at the logic gate 17 to form the output GATED CLOCK. The use of the circuit of FIG. 1 provides clock output GATED CLOCK that is gated by the input ENABLE signal without forming "runt" clock pulses on the output. The reference patent provides several other embodiments of the circuit of FIG. 1 using, for example, NOR gates instead of NAND gates, and other modifications that provide a gated clock output signal.

Figure 2:
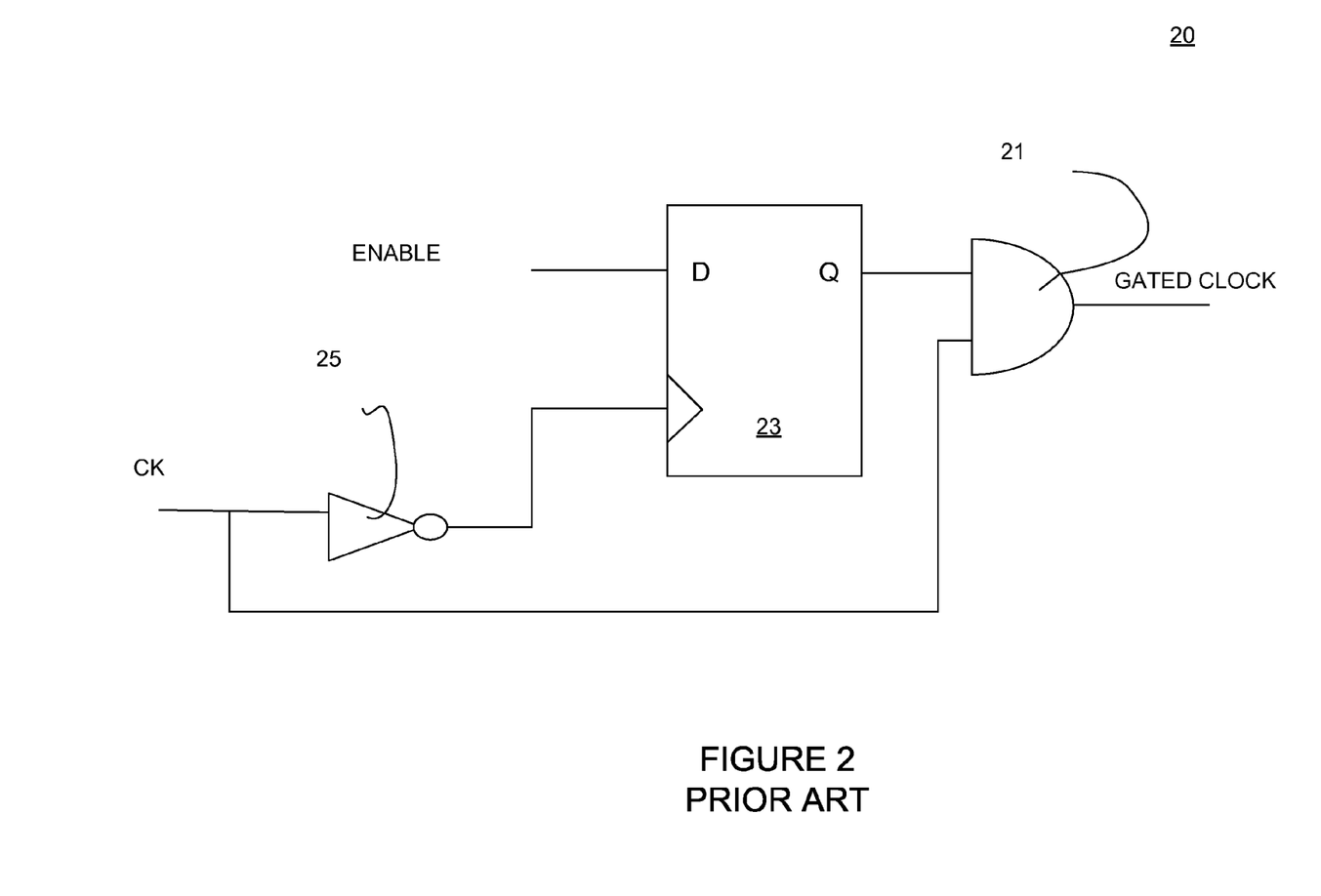
FIG. 2 depicts in a simple circuit schematic an alternate prior art circuit for providing a gated clock signal.

FIG. 2 depicts an alternative prior art approach gated clock circuit 20 that uses a register 23 to synchronize the enable signal ENABLE to the free running input clock signal CK. The output of the register Q and the clock CK are then logically combined by a logic gate 21 which then outputs the signal GATED CLOCK. This circuit is described in U.S. Pat. No. 6,782,486, which is also hereby incorporated by reference herein.

Figure 3:
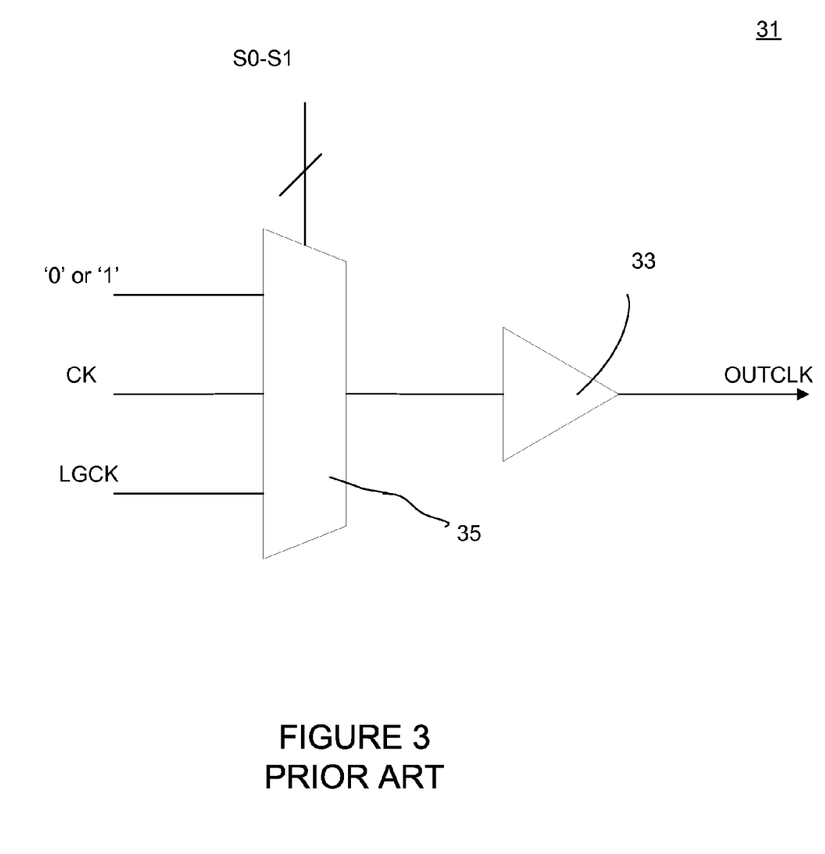
FIG. 3 depicts in a simple circuit diagram a prior art clock multiplexer for providing a clock signal selected from several possible clock sources.

A common feature of certain integrated circuit logic devices is the use of multiple clocks that are multiplexed to form a selected clock for a particular section. For example, in FIG. 3, using the S0-S1 inputs to clock multiplexer 35, the selection is made between a locally generated clock LGCK, a system clock CK which may be free running or operate at a different frequency, and a fixed value—that is, no clock at all. The multiplexer output is then buffered by output driver 33 to provide a clock output signal OUTCLK with sufficient drive to supply a group of synchronous circuits as the load.

Figure 4:
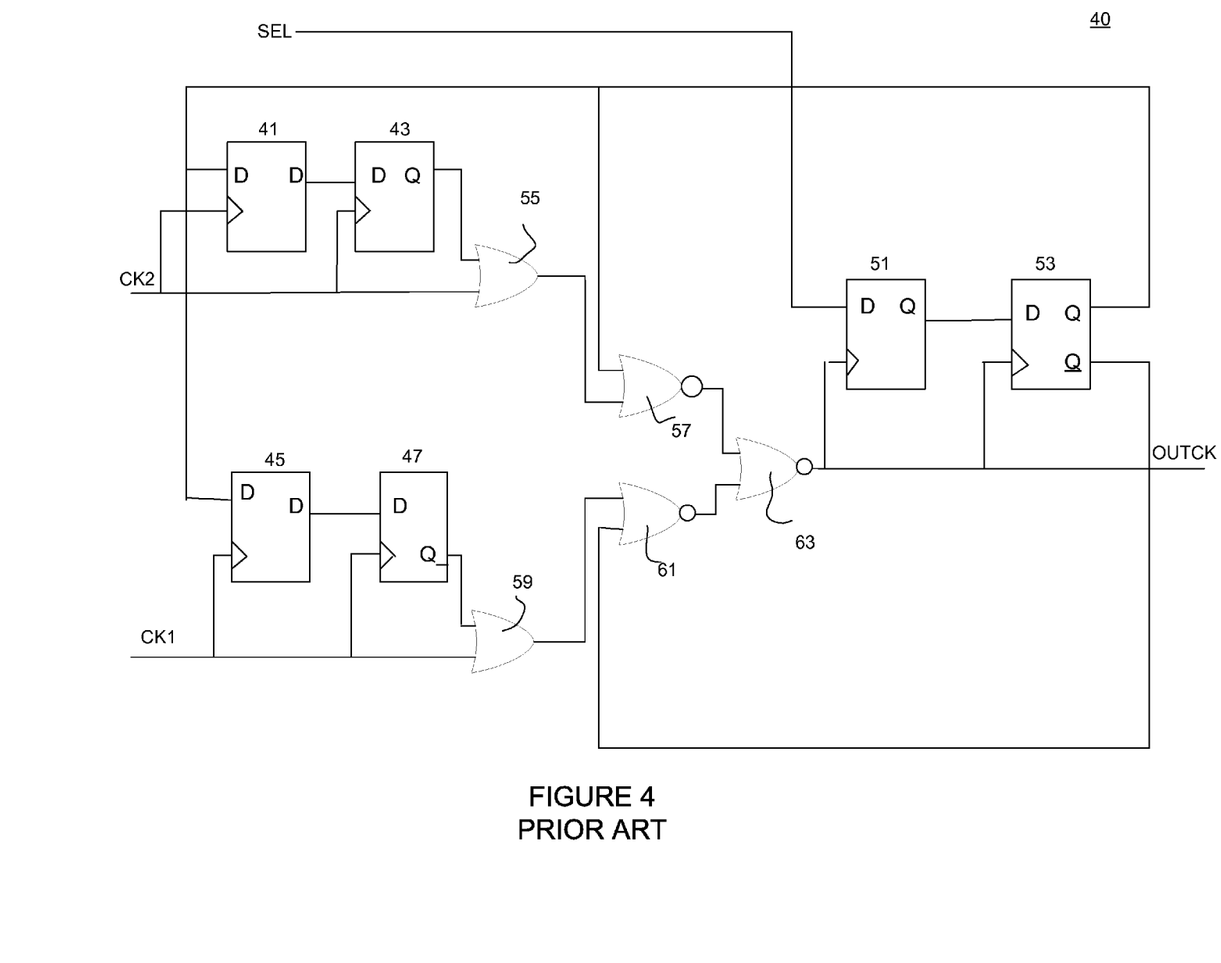
FIG. 4 depicts in a simple circuit diagram a prior art clock multiplexer circuit that selects a clock signal from two input clock signals.

The use of a clock multiplexer to select clocks is also sometimes done in a manner to prevent the clock output signal provided by the multiplexer from making false or short pulse transitions; for example, when the multiplexer selection input changes. FIG. 4 depicts a known clock multiplexer circuit 40 for selection between two clock signals CK1 and CK2, which provides an output signal OUTCK. The input select signal SEL is synchronized to the current output clock signal by registers 51 and 53 and when the input SEL transitions from one selection value to the other, the circuit provides a robust transition to the newly selected clock at the output. This circuit is described in U.S. Pat. No. 5,315,181, which is hereby incorporated by reference herein.

The use of clock gating circuits to save dynamic power in synchronous circuitry used in PLDs such as CPLDs and FPGAs continues to increase. A continuing need thus exists for an improved gated clock distribution circuit, and methods for facilitating the use of clock gating to lower power consumption in these PLD devices without the disadvantages of the prior art circuits.

SUMMARY

These and other problems are generally solved or circumvented, and technical advantages are generally achieved, by advantageous embodiments of the present invention which include, e.g., methods and apparatuses for facilitating providing gated clock signals in a programmable integrated circuit such as an FPGA. Embodiments of the invention include, for example, placing clock driver circuits at different levels within the clock distribution networks, thereby providing the power saving benefits of gated clock signals without the need for routing the clock enable signals throughout the device. Embodiments of the present invention include, e.g., enhanced clock driver circuitry with clock enable inputs that may be placed at various levels within the hierarchical clock distribution scheme. Advantageously, in some embodiments, automated electronic design tools may be used in cooperation with some user input or alternatively operating autonomously, to efficiently place clock drivers with gated clock signal outputs within the clock distribution network for a CPLD or FPGA.

In one exemplary embodiment, an illustrative programmable integrated circuit is provided, comprising a programmable clock network. The clock network receives a clock input signal and includes routing portions and buffer circuits arranged in a clock signal hierarchy. The clock network drives the routing portions for distributing clock signals to a plurality of synchronous elements responsive to the clock input signal. The buffer circuits include selectably programmable buffers for providing gated clock signals responsive to a clock enable signal, and the programmable clock network is operable to independently and dynamically enable various portions of the clock network using the selectably programmable buffers.

In another exemplary embodiment, an apparatus comprises a programmable integrated circuit such as an FPGA having a plurality of configurable logic elements (CLEs). Each of the CLEs comprises one or more synchronous elements coupled to one or more clock signals. At least one columnar region is disposed having vertical clock routing signals and vertical clock drivers for outputting clock signals onto the clock routing signals. The clock signals and drivers are characterized in that the clock signals are provided without significant clock skew between the clock routing signals for one or more global clock signals. One or more horizontal clock drivers are coupled to the vertical clock routing signals. The horizontal clock drivers are driving horizontal clock routing signals extending from the columnar region. One or more leaf clock drivers coupled to the horizontal clock routing signals for driving leaf clock signals to one or more of the synchronous elements within one or more CLEs. The CLEs are provided vertically along the horizontal clock signals, and a gated clock signal driver having a clock signal input and a clock enable input outputs a gated clock signal responsive to the value of the clock enable input. The gated clock signal is coupled to one or more of the vertical clock signals, horizontal clock signals, leaf drivers and leaf clock signals and to one or more of the synchronous elements. The clock enable signal can be disabled during predetermined time periods to reduce the dynamic power in one or more of the clocked elements by gating the clock signal to the clocked elements to a non-varying value.

In another exemplary embodiment, a method for distributing a clock signal on a programmable integrated circuit is disclosed, comprising receiving at least one input clock signal; distributing clock signals corresponding to the at least one input clock signal via a hierarchical clock network comprising routing portions and buffer circuits arranged in a clock signal hierarchy and driving the routing portions for distributing clock signals to a plurality of synchronous elements responsive to the clock input signal, wherein the buffer circuits include a plurality of selectably programmable buffers for providing gated clock signals responsive to a clock enable signal; and dynamically and independently disabling one or more portions of the hierarchical clock network responsive to the clock enable signal.

In various embodiments of the invention, the clock drivers may be placed, e.g., within a configurable logic block (CLB), in a circuit leaf subsection, inside a leaf portion, in a horizontal leaf driver, in a vertical column or leaf driver, or at any level in the PLD clock distribution hierarchy in a manner that may enhance the efficient use of silicon, enable more effective routing, and make possible effective circuit operations to save power.

BRIEF DESCRIPTION OF THE DRAWINGS

For a more complete understanding of the invention and the advantages thereof, reference is now made to the following descriptions taken in conjunction with the accompanying drawings, in which.

DETAILED DESCRIPTION

Figure 5:
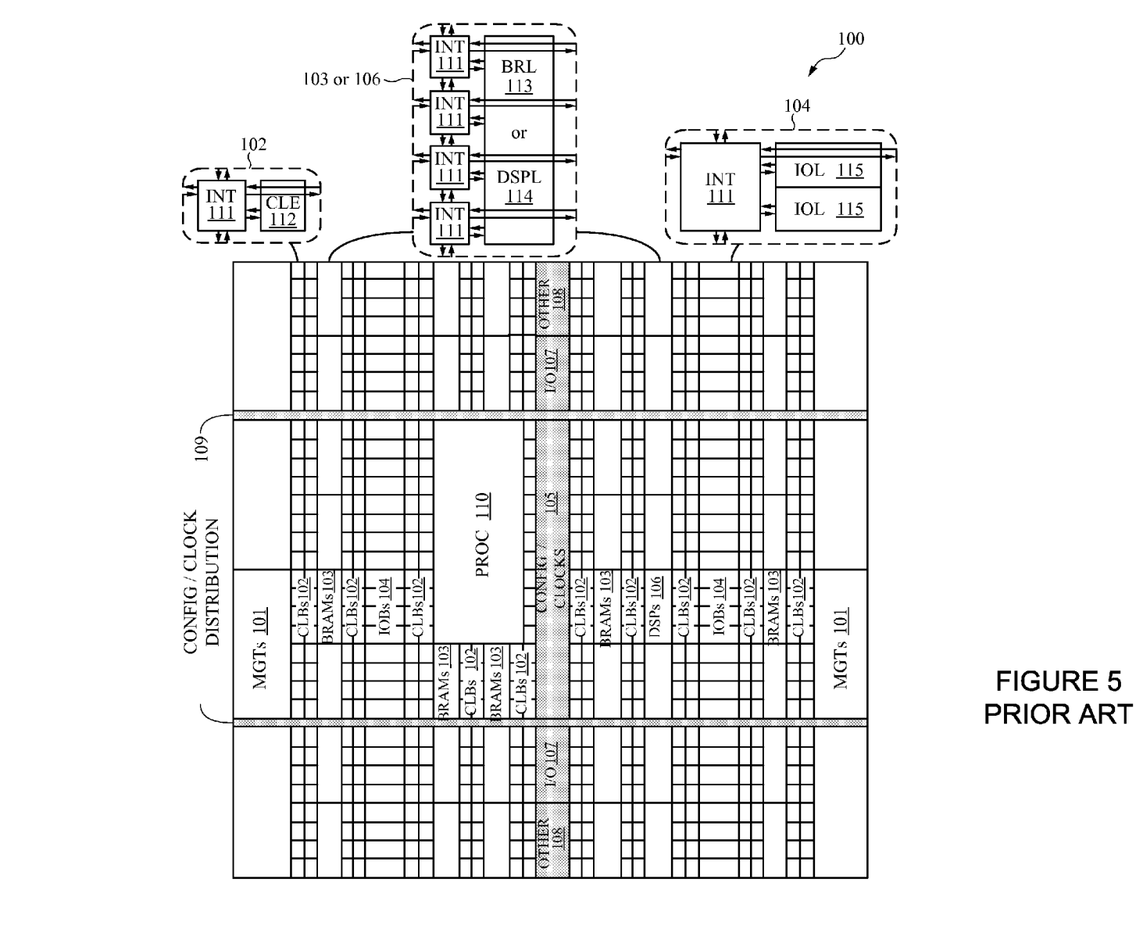
FIG. 5 depicts in a block diagram a programmable integrated circuit such as a FPGA having clock distribution networks.

FIG. 5 depicts as an illustrative non-limiting example, a commercially available prior art FPGA in a block diagram. This Virtex™-4 FPGA device is available from Xilinx, Incorporated, the assignee of the present application, and is described in detail in the Xilinx datasheet entitled "Virtex-4 FPGA Users Guide" published Jun. 17, 2008, and available from Xilinx, Inc., 2100 Logic Drive, San Jose, Calif. 95124, or at the web url www.xilinx.com/support/documentation/user_guides/ug070.pdf; which document is hereby incorporated herein by reference. (Xilinx, Inc., owner of the copyright, has no objection to copying these and other pages referenced herein but otherwise reserves all copyright rights whatsoever.) Young, et al. further describe the interconnect structure of the Virtex™ FPGA in U.S. Pat. No. 5,914,616, issued Jun. 22, 1999, and assigned to the assignee of the present application, entitled "FPGA Repeatable Interconnect Structure with Hierarchical Interconnect Lines", which is hereby incorporated herein by reference in its entirety.

FIG. 5 illustrates a programmable integrated circuit such as FPGA 100 that includes a large number of different programmable tiles including multi-gigabit transceivers (MGTs) 101, configurable blocks such as configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Some Virtex™ FPGAs also include dedicated processor blocks (such as PROC 110).

In some FPGAs, each programmable tile includes a programmable interconnect element (INT) 111 having standardized connections to and from a corresponding interconnect element in each adjacent tile. Therefore, the programmable interconnect elements taken together implement the programmable interconnect structure for the FPGA. The programmable interconnect element (INT) 111 also includes the connections to and from the programmable logic element within the same tile.

For example, a CLB 102 can include a configurable element such as configurable logic element (CLE) 112 that can be programmed to implement user logic plus a single programmable interconnect element (INT) 111. A BRAM 103 can include a BRAM logic element (BRL) 113 in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 106 can include a DSP logic element (DSPL) 114 in addition to an appropriate number of programmable interconnect elements. An IOB 104 can include, for example, two instances of an input/output logic element (IOL) 115 in addition to one instance of the programmable interconnect element (INT) 111. As will be clear to those of skill in the art, the actual I/O pads connected, for example, to the I/O logic element 115 are manufactured using metal layered above the various illustrated logic blocks, and typically are not confined to the area of the input/output logic element 115.

In the pictured embodiment, a columnar area near the center of the die (shown shaded in FIG. 5) is used for configuration, clock, and other control logic. Horizontal areas 109 extending from this column are used to distribute the clocks and configuration signals across the breadth of the FPGA.

Note that FIG. 5 is intended to illustrate only one exemplary FPGA architecture for the purposes of explanation. Many variations are possible. For example, the numbers of logic blocks in a column, the relative width of the columns, the number and order of columns, the types of logic blocks included in the columns, the relative sizes of the logic blocks, and the interconnect/logic implementations included at the top of FIG. 5 are purely exemplary. In an actual FPGA implementation, more than one adjacent column of CLBs is typically included wherever the CLBs appear, to facilitate the efficient implementation of user logic, but the number of adjacent CLB columns varies with the overall size of the FPGA.

Figure 6:
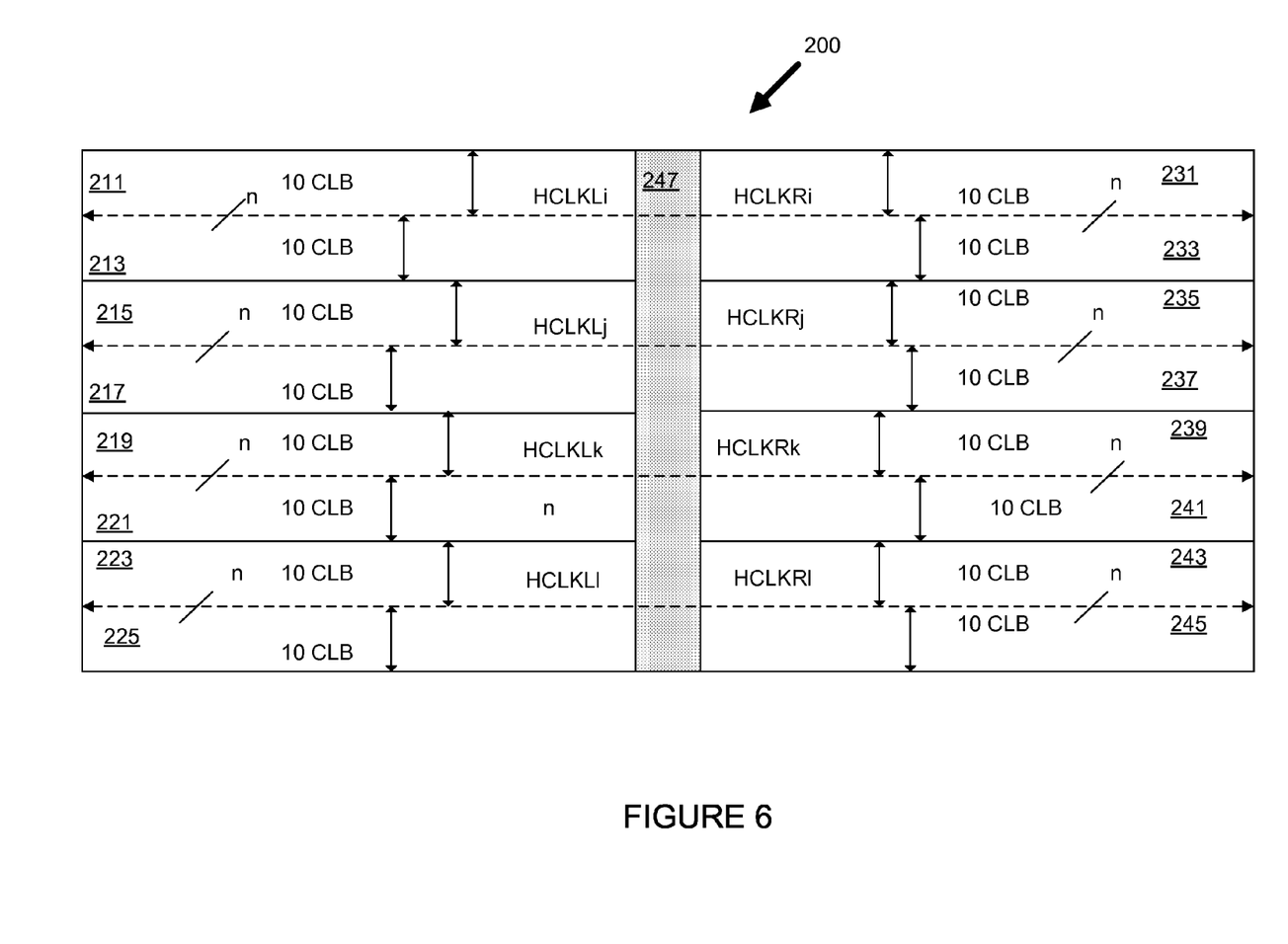
FIG. 6 depicts in a block diagram of a portion of an FPGA having vertical and horizontal clock distribution lines.

FIG. 6 illustrates in a simplified block diagram a clock distribution portion 200 of a CPLD such as an FPGA where one or more embodiments of the invention may be applied. In FIG. 6, vertical columnar region 247 contains clock drivers and clock busses for distributing clock signals. The portion 200 of the exemplary FPGA is also shown divided into left and right sides. For example, sections 211 and 213 form rows above and below the clock line(s) of width n labeled HCLKLi, or horizontal clock left T; the sections 231 and 233 form horizontal rows above and below the clock line(s) labeled HCLKRi, indicating horizontal clock line(s) right T. Thus for each horizontal clock line(s) i, j, k, l depicted in FIG. 6, there is a left side portion and a right side portion. Driver circuits within the columnar area 247, not shown in detail, drive clock signals onto each of these lines. Each horizontal section 211, 213, 215, 217, etc. to 245 is depicted as being 10 CLBs deep, that is, there are ten configuration logic blocks coupled to the horizontal clock lines along each section, arranged in a vertical column. The horizontal clock lines of width n may provide 1, 2, or any other number of clock lines per horizontal region, in one exemplary implementation there are 12 lines (n=12) for each horizontal portion HCLK.

Note the use of the descriptive terms "vertical" and "horizontal" in this description to distinguish portions of a clock distribution network in an integrated circuit. The use of these terms in this specification and the appended claims are recognized as arbitrary, explanatory designations. If a completed device is turned in its orientation, these terms may of course be interchanged. That is, a device may have some portions of a clock distribution network that are arranged in one direction, some portions that are arranged in another direction, and these fall within the terms as meant in this description, irrespective of the positioning of the device. Further, although in the illustrative examples depicted in the figures, the horizontal and vertical portions are drawn as perpendicular one to another for simplicity, these orientations are not necessary in all embodiments; other arrangements are also contemplated as alternative embodiments that fall within the scope of the appended claims. As one non-limiting example, although the lines are labeled as horizontal and vertical in the illustrative explanatory circuit schematics presented here, in the physical placement on a semiconductor substrate, these lines may have any orientation with respect to each other, including parallel.

Figure 7:
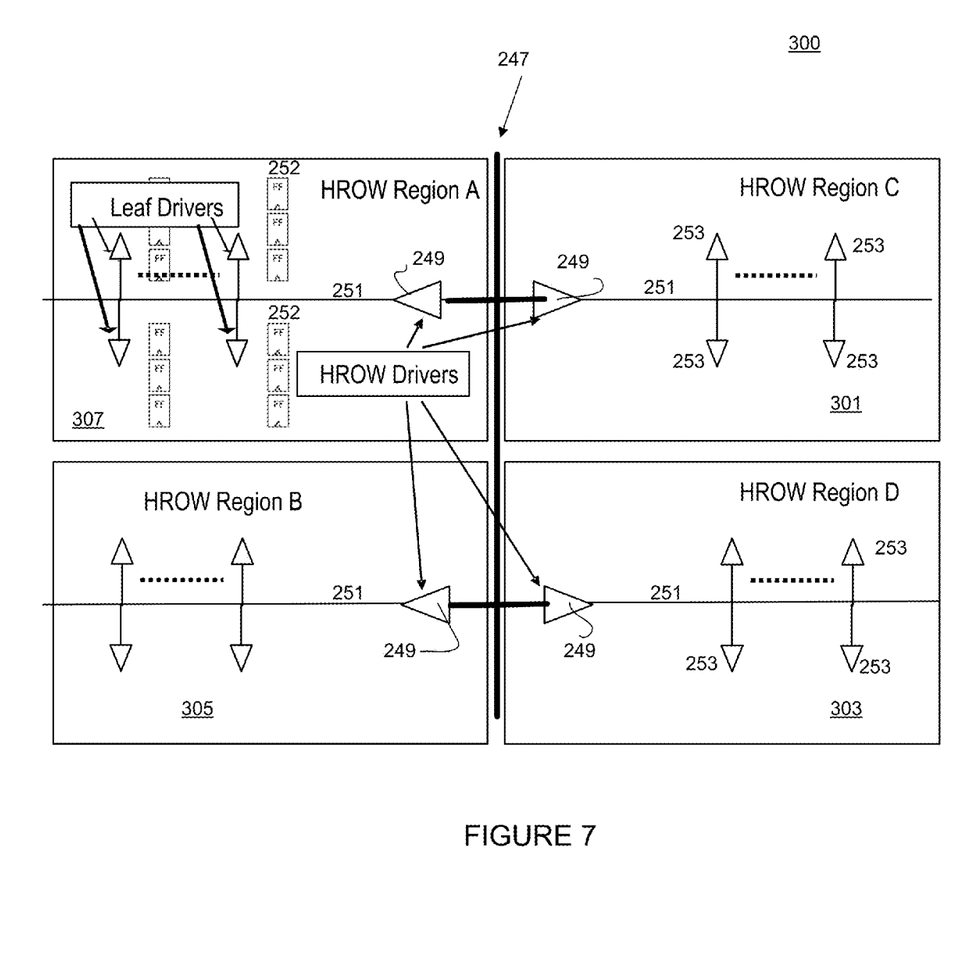
FIG. 7 depicts in a block diagram a portion of an FPGA having clock distribution in vertical and horizontal directions and having clock driver circuitry.

FIG. 7 depicts another portion 300 of a part of the FPGA portion 200 in FIG. 6, and further illustrates detail of a hierarchical clock distribution network. In FIG. 7, the column 247 is shown in more detail. Horizontal row drivers (HROW Drivers) 249 are shown coupled to horizontal clock distribution lines and drive clock signals onto each of the horizontal clock distribution lines 251. Each of these lines is further coupled to leaf drivers 253. For each portion 301, 303, 305, and 307, CLBs including clocked circuitry such as registers are provided coupled to clock lines output by the leaf drivers 253, which are coupled to the horizontal lines 251. In this manner the clock signals are distributed through the columnar routing area 247, onto horizontal clock lines 251, through the leaf drivers 253 and to the synchronous elements of the CLBs 252 which are arranged, in this example FPGA illustration, in vertical columns along the horizontal rows 251.

Because synchronous elements in various portions (CLBs 252) of the FPGA portion 300 may communicate registered or clocked output signals from one to the input of another clocked element, it is important that the clock signals arrive at these registers contemporaneously and without clock skew. The clock network distribution circuitry, including the horizontal and vertical routing lines, and the drivers such as the HROW drivers 249, and the leaf drivers 253 are therefore positioned and sized in a symmetric fashion so that the loading is similar on each clock signal portion, and the drive strength, rise and fall times, and loading is similar in each portion of the clock distribution hierarchy. In this manner, the output of a clocked register that feeds the input of another register located in another portion of the circuitry will be clocked properly.

The design criteria that must be met for the register elements to work properly are, e.g., the setup and hold time requirements. The minimum set up and hold times for the receiving register must be met by the output signal of the sourcing register. If the two registers were somehow clocked by rising and falling clock signals that were independent of one another, or had sufficient clock skew between them, proper operation could not be assured. The output of a register in such a case could transition in a manner that violates either a set up time requirement (input data to a register is held stable for a certain time period before a clock edge arrives) or the hold time requirement (input data to a register is maintained stable for a period of time after a clock edge arrives) of the destination register. If the setup or hold time requirement of a synchronous element such as an edge triggered register is violated, metastable or "ringing" operation may occur on the register output. Conservative design of the clock distribution scheme using similar line sizes and driver strengths for example, which is confirmed by circuit simulation and layout verification steps, ensure that this timing violation will not occur. By maintaining common clock line sizes, line lengths, clock line loading, and clock driver sizes and also layout symmetry in the clocking scheme, such timing problems are usually avoided or eliminated.

Figure 8:
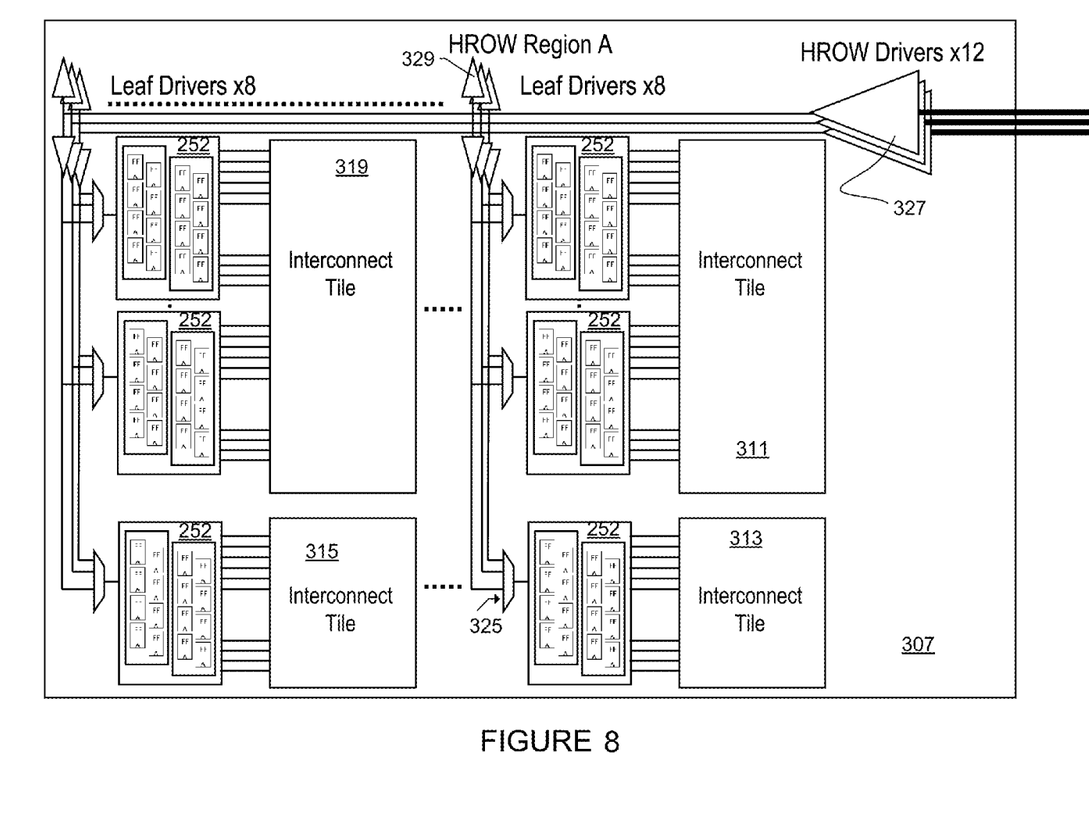
FIG. 8 depicts another block diagram of a portion of an FPGA having clock distribution in vertical and horizontal directions and having clock driver circuitry including multiplexers for selecting clock signals coupled to synchronous elements in CLBs.

FIG. 8 illustrates the clock signals in more detail for a portion of the exemplary FPGA embodiment of FIG. 7; here, region A (307) is depicted in an exemplary block diagram further illustrating the distribution of clocking signals. In this detailed view, HROW drivers 327 are provided in 12 instances; however, more or less instances of the drivers could be used in an actual device. Each horizontal line driven by the HROW drivers is routed to leaf drivers 329 which are shown as ×8 instances, so for each leaf there are 8 instances. Further, the HROW A portion shown in FIG. 8 has (n) clocking signals that are available for and routed to the CLBs. The multiplexers 325 each having n inputs allow selection for the clock to be used in a particular synchronous portion of a CLB. In the illustrative example shown in FIG. 8, there are 8 clock lines, and each multiplexer 325 would be an 8:1 multiplexer, many other arrangements are also contemplated as alternative embodiments. Since the multiplexers 325 choose between clocking signals, in some embodiments the clock multiplexer circuit of FIG. 4 could be used, for example. The clock multiplexer outputs the clock synchronous elements within CLBs 252 and these outputs are then coupled together using the programmable interconnect tiles 311, 313, 315 and 319.

In one exemplary embodiment of the invention, a gated clock signal can be formed within the clock hierarchy for a portion of an FPGA and that gated signal then can be routed to synchronous circuitry as a clock signal. A clock hierarchy, as used herein, includes the buffers and routing portions that distribute the clock signals from a clock source to the synchronous elements that receive the clock signals; these buffers and routing portions are typically arranged in a symmetrical manner so that each clocked element receives the clock without significant skew with respect to the other clocked elements receiving the same or a related clock. By forming the gated clock signal, the need for a separately routed clock enable line is eliminated. In this manner, a portion of a clocked circuit may be put in an inactive state, and dynamic power can be saved. In exemplary embodiments, the use of the gated clock signal is facilitated by using the gated clock signal at times this portion of the circuitry is not active. The use of the gated clock signal in the hierarchy allows many synchronous elements to be clocked by the same gated clock signal, eliminating the routing of individual clock enable lines for the synchronous elements.

Advantages of one or more embodiments over clock enable schemes of the prior art accrue in several areas. Power is saved not only by disabling the circuitry but the high fan-out clock enable signal of the prior art is also removed, saving driver power as the clock enable loading is greatly reduced. Routing area is also saved and thus more routing flexibility is available for non-clock signals, since the high fan-out clock enable signals of the prior art are no longer blocking routing resources. By removing a substantial portion of the clock enable signals from the gated clock tree, both dynamic power (previously needed for driving a high fan out line) and routing area (previously needed to route the many clock enable lines) are conserved.

Figure 9:
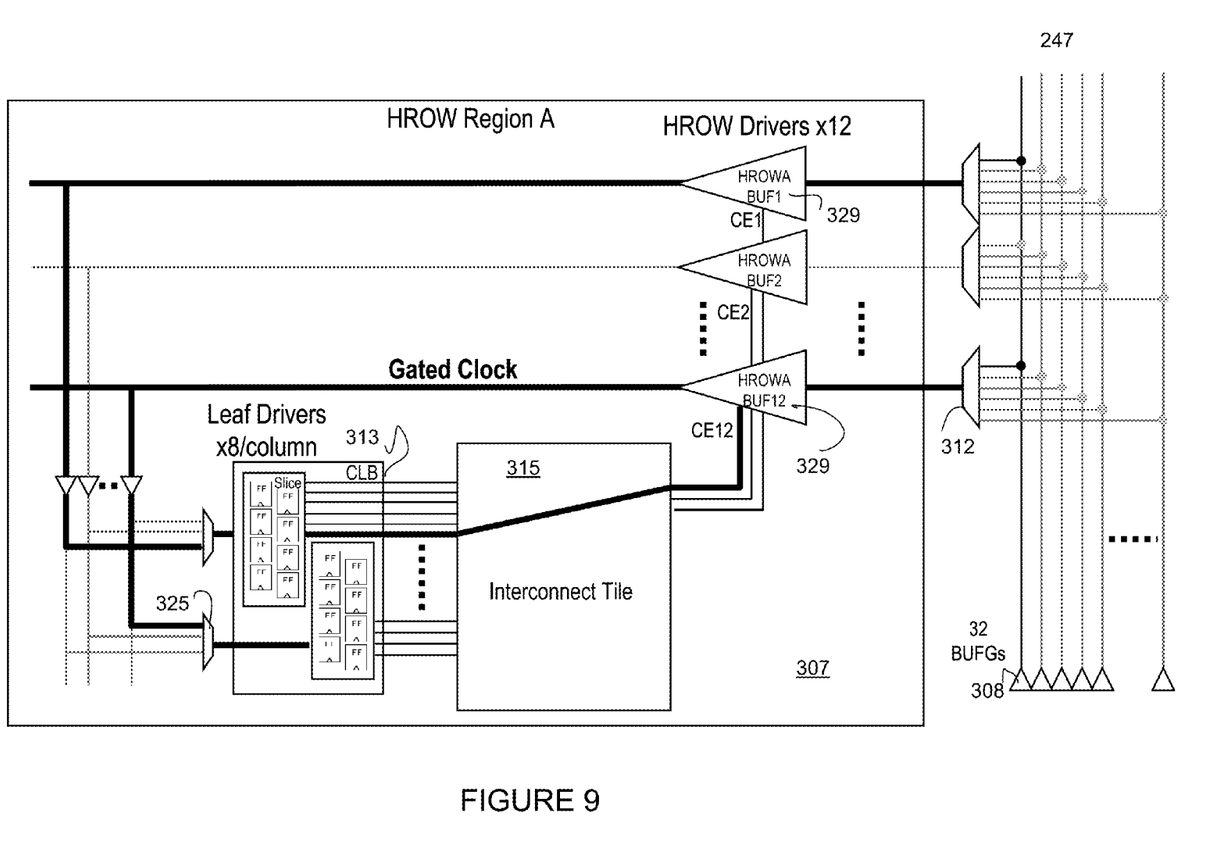
FIG. 9 depicts another block diagram of a portion of an FPGA having clock distribution circuitry, including vertical and horizontal direction clock distribution, and an embodiment clock buffer for providing a gated clock within a clock distribution hierarchy.

FIG. 9 depicts one exemplary implementation. In FIG. 9, columnar region 247 is depicted with vertical clock distribution lines driven by clock drivers 308 are shown with multiplexers 312 selecting an appropriate clock line from the vertical lines. The output of the multiplexers 312 are then coupled to horizontal row drivers 329, which are coupled to clock enables CE1 . . . CE12 in this example. In FIG. 9, the clock enables are formed using an example interconnect tile 315, synchronous circuitry within a CLB 313, and the clock multiplexers 325 such as shown in FIG. 8. In FIG. 9, the circuit 307 which may be, for example, HROW Region A in FIG. 8 is shown with horizontal HROW Drivers, ×12 instances, forming 3 clocks including one set of HROW drivers BUF12 that drives a horizontal clock line labeled "gated clock". The leaf drivers include one leaf driver that is coupled to the gated clock and forms a vertical clock line for the CLBs to receive. Multiplexers 325 receive at least three clock lines including the gated clock. The gated clock may be formed, as shown in FIG. 9, by a synchronous element, for example an edge triggered register or flip flop, which is part of the CLB 313. The output of a register that receives the clock enable input for the gated clock, and a system clock, is routed via the interconnect tile 315 to the clock enable input CE12 which is coupled to the HROW driver BUF12. In this embodiment, the clock enable is routed from one portion of the CLB 313, and the buffer BUF12 then drives a gated clock signal on a horizontal clock line. The horizontal clock line is in turn routed by the leaf drivers coupled to the gated clock line to the multiplexers. Note that although in the particular exemplary embodiment shown in FIG. 9 the output of CLB 313 gates a clock within HROW region 307, it could also gate any clock in FIG. 7, for example, in HROW regions 301-307. Further, there is no restriction that the clock enable signal from 313 gate only clocks that are synchronous to the CLB circuitry, the clock enable signal from CLB 313 could gate any clock in the CPLD, so long as the timing requirements for set up and hold are met for proper circuit operation. These alternative arrangements are contemplated as additional embodiments.

By selecting the gated clock input to the multiplexers 325 that feeds a clock signal to the CLB, synchronous elements in the CLB 313 coupled to the clock multiplexer 325 (configured to select the gated clock) will be clocked only when the gated clock signal is active. In this way, the HROWA driver BUF12 forms a single gated clock signal that is then routed to a plurality of synchronous elements, reducing the routing area needed in the prior art approach. Instead of routing a clock enable signal and a system clock signal to each of the synchronous elements, the gated clock signal is formed in the clock distribution hierarchy and a single routing resource is used. Power is saved in the FPGA by the use of the gated clock signal to stop the operation of the synchronous elements (e.g. registers or flip flops) when the gated clock signal is inactive. Importantly, while both the clock enable and gated clock remove power consumed in the synchronous elements, only the gated clock approach, also removes clock tree power at various levels in the clock hierarchy.

In alternative embodiments of the invention, the gated clock signal could be formed at a higher, or lower, point in the clock distribution hierarchy instead of the HROW driver of FIG. 9. The number of synchronous elements that are coupled to a common clock enable signal may be identified using automatic design tools, manual input from a designer, or a combination of the two. These tools may be used to determine how much drive strength and how many loads are available to be driven by a particular gated clock signal.

Further, in one embodiment, the clock enable and the clock being gated are synchronous to one another, however, as long as the set up and hold time requirements are met and the clock gating circuit is carefully designed, the clock enable signal and the clock signal being gated do not have to be synchronous. Any clock enable signal, including one from another portion of the circuitry that is provided by another clock regime, may be used to gate a clock. The latter may be used to statically gate on and off a section of the clock hierarchy.

Figure 10:
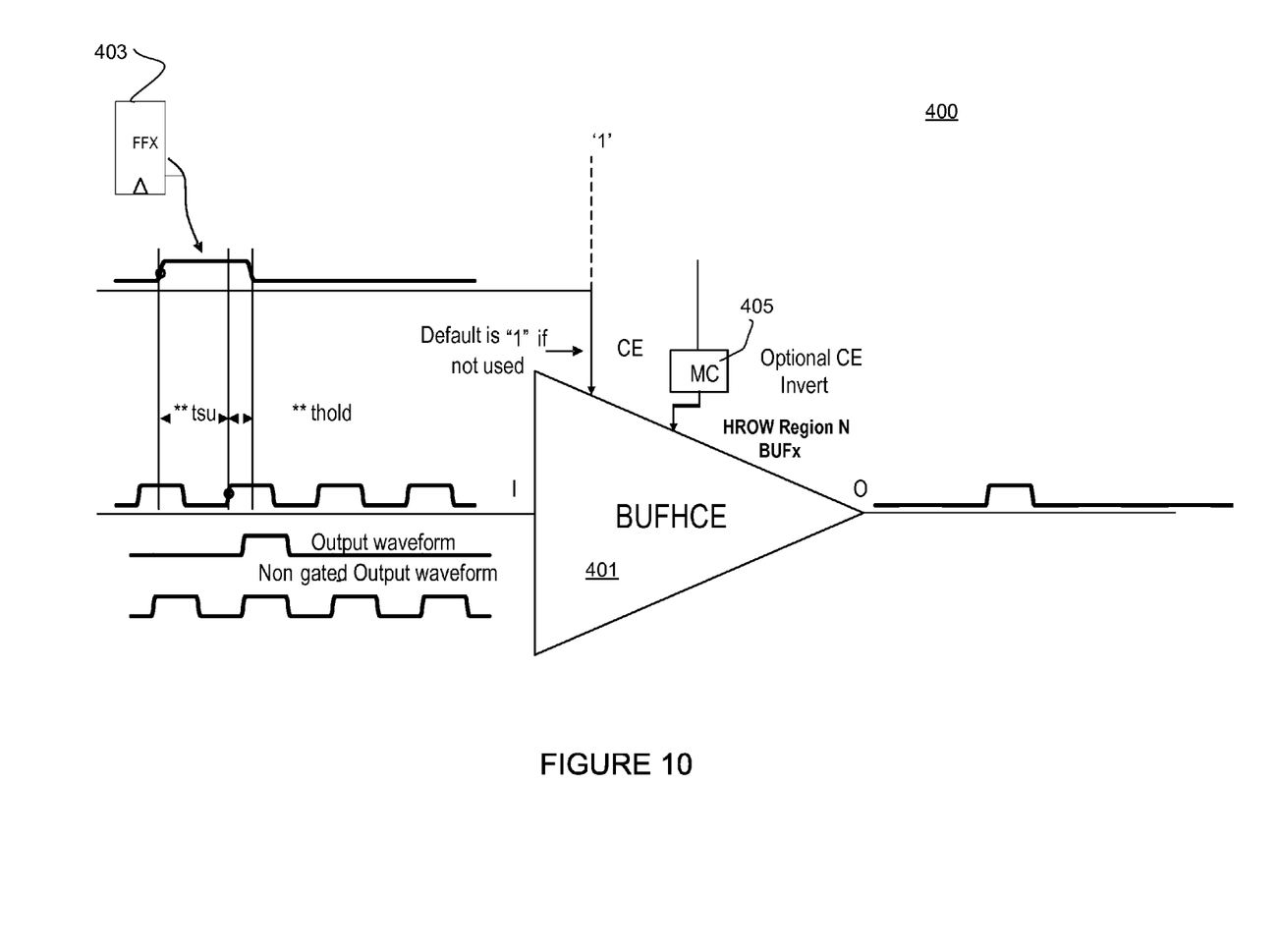
FIG. 10 depicts the operation of an embodiment of a clock buffer or driver providing a gated clock signal for use in one or more embodiments of the invention providing gated clock signals within a clock distribution hierarchy for an FPGA.

FIG. 10 illustrates in a simplified circuit embodiment, a first circuit for providing an exemplary gated clock buffer used to implement one or more embodiments of the invention. In FIG. 10, a buffer denoted as BUFHCE is depicted. The input signal is a clock signal, such as the system clock or another free running clock. A second input signal is the clock enable input CE. The clock enable signal may be provided, as in the embodiment of FIG. 9, by a register or flip flop that receives the clock enable as a logical input signal that is then clocked by the system clock. The output of the register 403 then forms a waveform that is synchronous to the clock edges and therefore meets the set up and hold requirements for the circuitry within the buffer 401. The output of the buffer 401 is shown as a single pulse in this example, a clock pulse that is gated by the single pulse on the CE input. The inverter 405 is an optional block that may be used when it is desirable to invert the clock enable signal, e.g. when the clock enable signal is an active "low" signal. The clock enable signal may not be used in all instantiations of the buffer BUFHCE; if it is not used, it is to be tied to a logic high signal or Vdd voltage, in which case the output will follow the input.

The waveforms depicted in FIG. 10 show a free running clock input to the signal I and the output waveform corresponding to the single clock enable pulse, with the required setup time "tsu" and the required hold time "thold" for the circuitry within the buffer BUFHCE shown. The trace labeled "output waveform" shows a single output pulse. The trace labeled "Non gated output waveform" shows what the output would look like for an instance of the buffer BUFHCE where the clock enable is tied high.

The circuitry used to implement the buffer BUFHCE can be, for example, the circuitry shown in FIG. 1 or FIG. 2. In addition, other buffer circuitry with an enable signal could be used so long as the circuit is adapted to prevent the undesirable "runt" signals at the gated clock output, for example when the enable input changes value.

Figure 11:
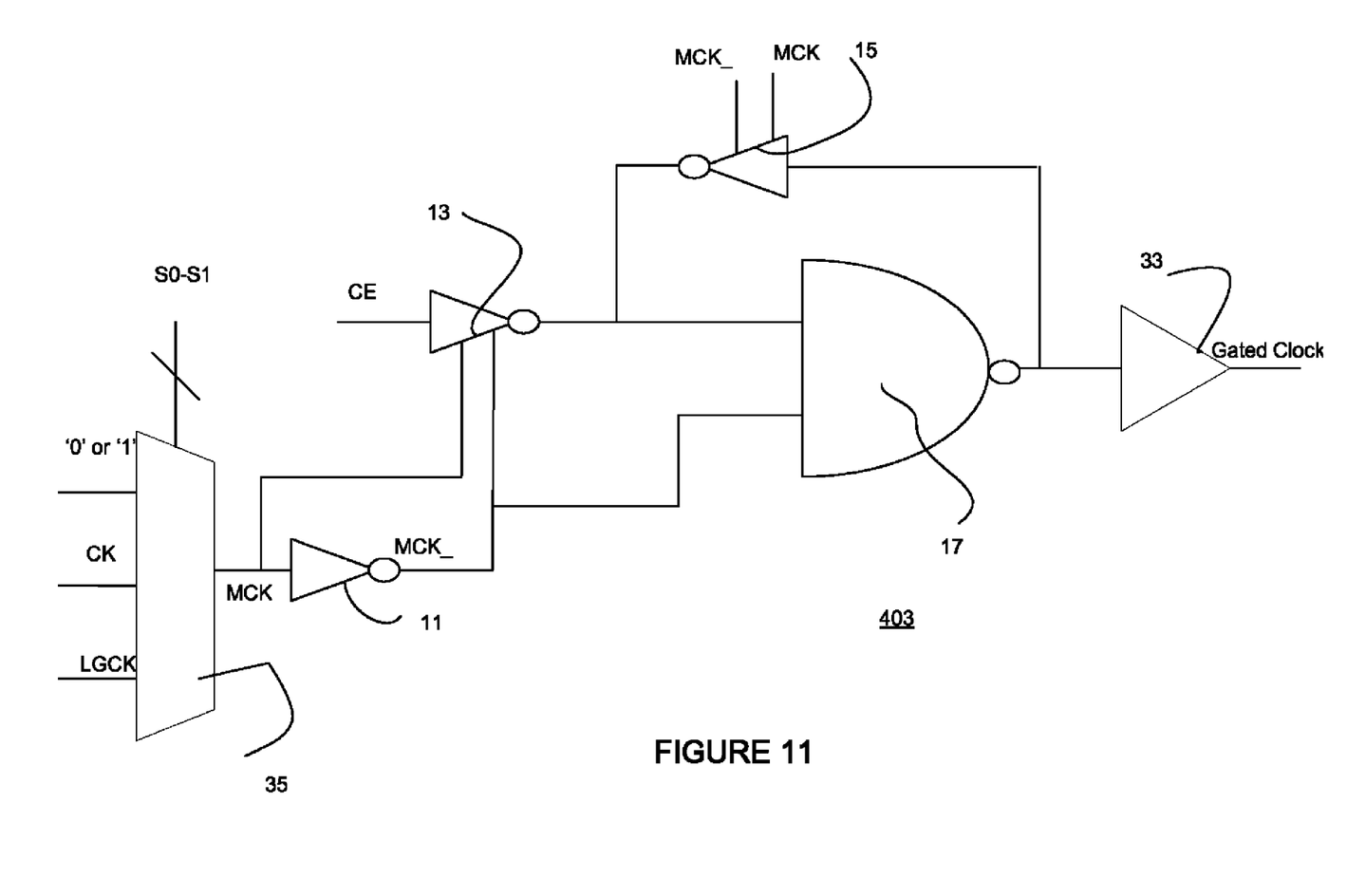
FIG. 11 depicts in a circuit diagram an embodiment of the clock buffer of FIG. 10 for providing a gated clock output and incorporating a clock selection multiplexer for use in a hierarchical clock distribution for an FPGA.

In FIG. 11, another exemplary embodiment is shown for a clock gating circuit that may be used. The multiplexer 35 and the output driver 33 are shown, as in FIG. 3; combined with clock gating circuitry element 11, logic gate 17 (e.g., a NAND gate), and elements 13 and 15, as in FIG. 1, to form a gated clock circuit that includes the clock multiplexer. Thus, a gated clock buffer 403 is formed that has, in this example embodiment, a fixed input clock, a free running or system input clock CK, a locally generated clock LGCK input into a multiplexer 35, the selection made by inputs S0-S1. The multiplexer output MCK then drives the clocking input of a gated clock circuit such as, for example, the one depicted in FIG. 1, arranged with elements 11, 13 and 15, and with logic gate 17 to prevent "runt" pulses. The output of the circuit is gated with an input CE to element 13. Finally, a driver 33 is shown driving the gated clock signal.

The buffer 403 could also be placed in various levels of the clock distribution hierarchy of an FPGA. In this manner, the need for multiple clock multiplexers adjacent the CLBs can be reduced or in some applications may be eliminated. Instead, the clock selection may be done at a higher level in the hierarchy and the gated clock signal may then be routed to the CLBs, saving the routing channels that would have been needed to route the clock signal CK, the locally generated clock signal LGCK, and the clock enable signal, CE, to the various synchronous elements in the CLBs.

The exemplary embodiments described above were described in reference to an FPGA application. However, in alternative embodiments, the methods and circuits of the present invention could be applied to CPLDs generally when gated clock signals are used.

Those skilled in the art will recognize that many obvious modifications to the exemplary embodiments may be made while still using the disclosed inventions. For example, some of the terms used in the foregoing and the appended claims are chosen with regards to the presently used terms in the relevant art and being used in draft standards presently in work; changes in these terms and abbreviations over time by use in the industry and in standard drafting are contemplated and do not change the scope of the inventions disclosed nor limit the scope of the appended claims. These modifications are contemplated as additional embodiments are considered as within the scope of the invention and fall within the scope of the appended claims.

What is claimed is:

1. A programmable integrated circuit, comprising:
a programmable clock network coupled to receive a clock input signal and comprising routing portions and buffer circuits arranged in a clock signal hierarchy and driving the routing portions for distributing clock signals to a plurality of synchronous elements responsive to the clock input signal, wherein the buffer circuits include a plurality of selectably programmable buffers configured to gate clock signals responsive to a clock enable signal, and the programmable clock network is operable to independently and dynamically enable various portions of the clock network using the selectably programmable buffers, wherein the clock enable signal provided to each programmable buffer is buffer-specific.

2. The programmable integrated circuit of claim 1, wherein the plurality of programmable buffers comprise a first programmable buffer and a second programmable buffer, wherein the first programmable buffer and the second programmable buffer are configured to pass a same clock signal, and wherein the first programmable buffer is configured to gate the clock signal and the second programmable buffer is configured to pass the clock signal.

3. The programmable integrated circuit of claim 1, wherein the clock enable signal provided to at least one of the plurality of programmable buffers is a synchronous enable signal output by a clocked element within a configuration logic block, and coupled to the programmable buffer through an associated interconnect tile.

4. The programmable integrated circuit of claim 1, wherein the programmable clock network further comprises:

a plurality of multiplexers outputting a selected clock signal of a plurality of clock signals, wherein each of the plurality of programmable buffers receives the selected clock signal output from one of the plurality of multiplexers, and wherein the clock enable signal provided to each of the plurality of programmable buffers is independent of clock signal selecting circuitry of the plurality of multiplexers.

5. The programmable integrated circuit of claim 1 wherein the clock network comprises a columnar portion that is oriented in a first direction, and wherein the clock network further comprises row portions coupled to the columnar portion oriented in a second direction different from the first direction.

6. The programmable integrated circuit of claim 5 wherein the second direction is horizontal to the first direction.

7. The programmable integrated circuit of claim 6 wherein at least one of the programmable buffers is coupled between the columnar portion and at least one clocked element and receives a clock signal from the columnar portion of the clock network and outputs a gated clock signal to the clocked element via other portions of the clock network, responsive to the enable signal.

8. The programmable integrated circuit of claim 7 and further comprising a clock multiplexer coupled between a portion of the clock distribution network and a clocked element and having at least two clock inputs and an clock output that follows a selected one of the at least two clock inputs, responsive to a select input.

9. An apparatus, comprising:

a programmable integrated circuit having a plurality of configurable elements each comprising one or more clocked elements coupled to one or more clock signals;

at least one columnar region having first direction clock routing signals and first clock drivers for outputting clock signals onto the first direction clock routing signals without significant clock skew between the first direction clock routing signals for one or more global clock signals;

one or more second direction clock drivers coupled to the first direction clock routing signals and driving second direction clock routing signals extending from the columnar region;

one or more leaf clock drivers coupled to the second direction clock routing signals for driving leaf clock signals to one or more of the clocked elements within one or more configurable elements, the configurable elements being disposed in the first direction along the second direction clock routing signals; and a gated clock signal driver having a clock signal input and a single clock enable input and outputting a gated clock signal responsive to the value of the clock enable input;

wherein the gated clock signal is coupled to one or more of the first direction clock signals, second direction clock signals, leaf drivers and leaf clock signals to clock one or more of the clocked elements, wherein at least one of the configurable elements further comprises a configuration block and an interconnect tile, and wherein the clock enable signal is a synchronous enable signal output by a clocked element within the configuration block, and coupled through an associated interconnect tile to the gated clock signal driver.

10. The apparatus of claim 9 wherein the gated clock signal driver is a second direction clock signal driver.

11. The apparatus of claim 9 wherein the gated clock signal driver is a leaf driver.

12. The apparatus of claim 9, wherein the clock enable signal is disabled during predetermined time periods to reduce the dynamic power in one or more of the clocked elements by gating the clock signal to the clocked elements to a non-varying value.

13. The apparatus of claim 9, and further comprising a clock multiplexer positioned between the leaf driver circuits and the configurable elements, and having at least two clock inputs and a clock selection input; and outputting a clock signal to at least one clocked element.

14. A method for distributing a clock signal on a programmable integrated circuit, comprising:

receiving at least one input clock signal;

distributing clock signals corresponding to the at least one input clock signal via a programmable clock network comprising routing portions and buffer circuits arranged in a clock signal hierarchy and driving the routing portions for distributing clock signals to a plurality of synchronous elements responsive to the clock input signal, wherein the buffer circuits include a plurality of selectably programmable buffers, wherein each programmable buffer is configured to gate a clock signal responsive to a buffer-specific clock enable signal; and dynamically and independently disabling one or more portions of the hierarchical clock network responsive to the clock enable signal.

15. The method of claim 14 and further comprising:

forming a gated clock signal within the hierarchical clock network that outputs a clock signal responsive to the enable signal; and driving one or more routing portions with the gated clock signal.

16. The method of claim 15 and further comprising:

clocking one or more synchronous elements with the gated clock signal;

the synchronous elements consuming reduced dynamic power when the gated clock signal is disabled.

* * * * *